(12) United States Patent
Chen et al.

(10) Patent No.: US 10,182,238 B2
(45) Date of Patent: Jan. 15, 2019

(54) SYSTEMS AND METHODS FOR CONTROLLING VIDEO DISPLAY

(71) Applicant: Hangzhou Hikvision Digital Technology Co., Ltd., Hangzhou (CN)

(72) Inventors: Jie Chen, Hangzhou (CN); Shiliang Pu, Hangzhou (CN); Hai Yu, Hangzhou (CN)

(73) Assignee: Hangzhou Hikvision Digital Technology Co., Ltd., Hangzhou (CN)

(*) Notice: Subject to any disclaimer, the term of this patent is extended or adjusted under 35 U.S.C. 154(b) by 279 days.

(21) Appl. No.: 15/079,449

(22) Filed: Mar. 24, 2016

(65) Prior Publication Data
US 2016/0286231 A1 Sep. 29, 2016

(30) Foreign Application Priority Data
Mar. 25, 2015 (CN) .......................... 2015 1 0131031

(51) Int. Cl.
| | |
|---|---|
| *H04N 19/52* | (2014.01) |
| *H04N 19/112* | (2014.01) |
| *H04N 21/8547* | (2011.01) |
| *H04N 19/50* | (2014.01) |
| *H04N 19/139* | (2014.01) |
| *H04N 19/42* | (2014.01) |
| *H04N 19/70* | (2014.01) |

(52) U.S. Cl.
CPC ........... *H04N 19/52* (2014.11); *H04N 19/112* (2014.11); *H04N 19/139* (2014.11); *H04N 19/42* (2014.11); *H04N 19/50* (2014.11); *H04N 19/70* (2014.11); *H04N 21/8547* (2013.01)

(58) Field of Classification Search
CPC .................................................... H04N 19/136
USPC .................................................... 375/240.16
See application file for complete search history.

(56) References Cited

U.S. PATENT DOCUMENTS

| | | | |
|---|---|---|---|
| 2001/0036355 A1* | 11/2001 | Kelly ................... | G11B 27/034 386/290 |
| 2002/0136309 A1 | 9/2002 | Imura et al. | |
| 2006/0204219 A1* | 9/2006 | Kamio ................ | G11B 27/322 386/330 |

(Continued)

FOREIGN PATENT DOCUMENTS

| | | |
|---|---|---|
| EP | 1195996 A2 | 4/2002 |
| EP | 2076052 A2 | 7/2009 |

OTHER PUBLICATIONS

European Patent Office, Communication Pursuant to Article 94(3) EPC, in Application No. EP 16162352, dated Jul. 25, 2017.

(Continued)

*Primary Examiner* — William C Vaughn, Jr.
*Assistant Examiner* — Jae N Noh
(74) *Attorney, Agent, or Firm* — Jones Day

(57) ABSTRACT

Systems and methods are provided for video display control. An example method includes: determining, by one or more processors, whether a coding frame extracted from a video coding stream is an I Frame; if the coding frame extracted from the video coding stream is an I Frame, acquiring, by the one or more processors, a timestamp of the I Frame and a timestamp of an adjacent coding frame after the I Frame; and controlling, by the one or more processors, display of the I Frame based on the timestamp of the I Frame and the timestamp of the adjacent coding frame after the I Frame.

6 Claims, 11 Drawing Sheets

(56) References Cited

U.S. PATENT DOCUMENTS

2010/0094931 A1* 4/2010 Hosur ................ H04N 7/17318
                                                                709/203
2011/0305428 A1* 12/2011 Hosokawa ........... G11B 27/322
                                                                386/230
2012/0033730 A1    2/2012 Lee

OTHER PUBLICATIONS

European Patent Office, Response to Communication Pursuant to Article 94(3) EPC, in Application No. EP 16162352, dated Nov. 27, 2017.

European Search Report, in Application No. EP 16162352, completed Jul. 21, 2016.

Fibush, David; Timing and Synchronization Using MPEG-2 Transport Streams; Society of Motion Picture & Television Engineers Journal, 105(7); pp. 395-400; Jul. 1996.

Anonymous; How To Get Time Stamp of Closest Keyframe Before a Given Timestamp With FFmpeg?; http://superuser.com/questions/554620/hot-to-get-time-stamp-of-closest-keyframe-before-a-given-timestamp-with-ffmpeg; Jul. 2016.

European Patent Office, Preliminary Opinion and Summons to Attend Oral Proceedings pursuant to Rule 115(1) EPC, in Application No. EP 16162352, dated Feb. 15, 2018.

* cited by examiner

SYSTEMS AND METHODS FOR CONTROLLING VIDEO DISPLAY

CROSS-REFERENCES TO RELATED APPLICATIONS

This application claims priority to Chinese Patent Application No. 201510131031.5, filed on Mar. 25, 2015, incorporated by reference herein for all purposes.

BACKGROUND

Video encoding is a process of encoding dynamic pictures and digitizing analog picture signals. The video encoding process can implement picture frequency band compression, and reduce or eliminate redundancy of information in digital pictures, so as to enable the channel capacity for transmission of a video to be smaller than the channel capacity for analog transmission.

The video encoding is usually implemented by a video encoder. Traditional video encoder generally divides coding frames into three types: I Frames, P Frames and B Frames.

Usually, after a video coding stream is received at a video receiving end, a video player will be used to decoding the coding frames of the video coding stream to obtain relevant data, and then display the objects corresponding to the relevant data, for example, a universal player is used for displaying video pictures corresponding to the coding frames of the video coding stream. A universal player refers to the player application software which is popular in the market or is widely used, such as Visible Light Communication (VLC) multimedia player, Storm Codec, Microsoft's media player, etc.

Conventionally, the decoding process of the traditional encoder is as follows: firstly decoding the I Frames and then successively decoding in sequence. When the number of the coding frames is relatively large and particularly the P Frames and the B Frames need to refer to other frames, the decoding process may encounter an excessive number of the coding frames to be decoded, which may result in relatively high resource consumption and low efficiency for decoding during random access.

Hence it is highly desirable to improve the techniques for controlling the display of video coding streams.

BRIEF SUMMARY

In one aspect, an embodiment of the present disclosure provides a method for controlling video display, which includes: determining, by one or more processors, whether a coding frame extracted from a video coding stream is an I Frame; if the coding frame extracted from the video coding stream is an I Frame, acquiring, by the one or more processors, a timestamp of the I Frame and a timestamp of an adjacent coding frame after the I Frame; and controlling, by the one or more processors, display of the I Frame based on the timestamp of the I Frame and the timestamp of the adjacent coding frame after the I Frame.

In another aspect, another embodiment of the present disclosure provides a method for controlling video display, which includes: determining whether a coding frame extracted from the video coding stream is an I Frame; if the coding frame is an I Frame, acquiring a serial number of the I Frame and a serial number of an adjacent coding frame after the I Frame; determining whether the serial number of the I Frame and the serial number of the adjacent coding frame after the I Frame are continuous; if the serial number of the I Frame and the serial number of the adjacent coding frame after the I Frame is continuous, displaying the I Frame; and if the serial number of the I Frame and the serial number of the adjacent coding frame after the I Frame is not continuous, not displaying the I Frame.

In another aspect, another embodiment of the present disclosure provides a system for controlling video display, which includes: an extraction device configured to extract a coding frame from a video coding stream; a determination device configured to determine whether the extracted coding frame is an I Frame; and a display control device configured to, perform display control on the I Frame based on the timestamp of the I Frame and the timestamp of the adjacent coding frame after the I Frame, if the coding frame extracted from the video coding stream being determined as an I Frame.

In another aspect, another embodiment of the present disclosure provides a system for controlling video display, which includes: a processor, a communication interface, a memory and a communication bus, wherein the processor, the communication interface and the memory communicate with each other through the communicate bus; the memory is configured to store a program, and the processor is configured to execute the program to implement: determining whether a coding frame extracted from a video coding stream is an I Frame; if the coding frame extracted from the video coding stream is an I Frame, acquiring a timestamp of the I Frame and a timestamp of an adjacent coding frame after the I Frame; and controlling display of the I Frame based on the timestamp of the I Frame and the timestamp of the adjacent coding frame after the I Frame.

Depending upon embodiments of the present disclosure, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Embodiments of the present disclosure provides a method and system for controlling video display to avoid the residence time of the display of the I frame being too long when the video coding stream is displayed by a universal player, to solve the problem of abnormal time stay during the display of the decoded data of the I frame.

I Frame represents one frame type specified by video encoding and decoding standard. Each I Frame adopts an intra-frame prediction encoding method to preserve completely data of one frame of picture, and one I Frame is an independent frame with all the data of the picture. When the I Frame is decoded, one picture frame can be acquired by independently decoding the I Frame, and the decoding process does not rely on other frames, that is, the complete picture may be acquired by decoding the I Frame only without referring to other frames.

P Frames are forward prediction frames. Each P Frame does not contain the complete data of a picture, but each P Frame contains the difference between the present frame and the previous I Frame or P Frame. When the P Frame is decoded, the previous P Frame or I Frame can be taken as reference, to superimpose the previous I Frame or P Frame with the present frame to generate a final picture.

B Frames are bidirectional differential frames (bidirectional prediction frames). Each B Frame records the difference between the present frame and the previous frame and the next frame. When the B Frame is decoded, not only the picture before decoding, but also the picture after decoding may need to be acquired. Namely, both the previous frame and the next frame are taken as references to superimpose the differential data between the previous picture and the next picture and the present frame, and then the final picture can be acquired. Both the P Frame and the B Frame need to refer to other frames and have dependent relation with other frames. A complete picture cannot be acquired by decoding the P Frames or the B Frames only.

Figure 1:
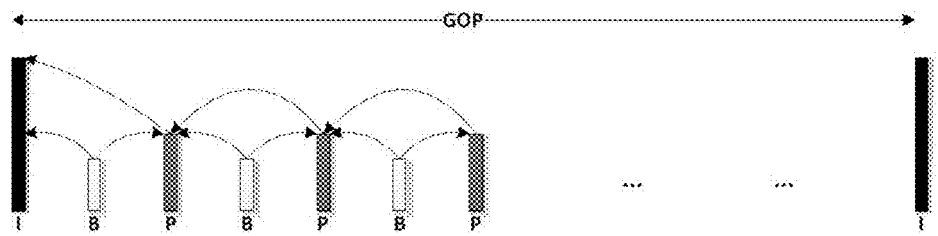
FIG. 1 is an example diagram showing a reference relationship among three frame types.

FIG. 1 is an example diagram showing a reference relationship among three frame types. According to the reference relationship of the coding frames in FIG. 1, when a coding stream is displayed, an I Frame is firstly decoded, and then related P and B Frames are decoded in order to display corresponding frame data. Generally, the I Frame, and the P Frames and the B Frames in the reference relationship with the I Frame are known jointly as a picture group or a group of pictures (GOP for short).

For the video coding stream after encoding, random access to a picture frame in the coding stream can be realized. In order to realize random access, it may be needed to firstly locate the I Frame in the GOP to which a target frame belongs, and then decode in sequence all the I Frames, the P Frames and the B Frames before the target frame. As the number of the coding frames is relatively large and particularly the P Frames and the B Frames need to refer to other frames, the decoding process may encounter an excessive number of the coding frames to be decoded, which may result in relatively high resource consumption for decoding and low efficiency during random access.

Embodiments of the present disclosure provides an modified coding method which can produce an modified coding stream including I Frames, Refreshment P Frames and common P Frames to reduce code rate and the consume of decoding.

Figure 3:
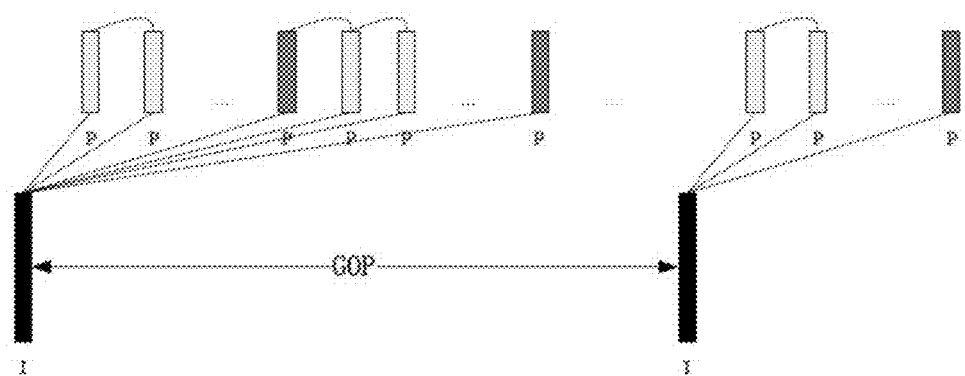
FIG. 3 is an example diagram showing a reference relationship among different types of frames in a video coding stream, according to one embodiment of the present disclosure.

For example, FIG. 3 illustrates an example diagram showing a reference relationship among different types of frames in a video coding stream, according to one embodiment of the present disclosure. As shown in FIG. 3, three types of coding frames and GOPs of the coding stream are described as follows:

In one embodiment, an I Frame is an independent frame with all picture data kept by intra-frame prediction encoding. An I Frame can be decoded independently without relying on other frames, and the decoding process of the I Frame is independent of other fames of pictures.

In one embodiment, a Refreshment P Frame is a forward prediction reference frame. A forward intra-frame prediction encoding algorithm is applied in the encoding process. A reference frame of a refreshment P Frame is a preceding I Frame closest to the refreshment P Frame. Since intra-frame prediction of the refreshment P Frame refers to the I Frame rather than the preceding P Frame, quick search and quick decoding may be achieved during random access or video playback, and the decoding wait time is shortened.

In one embodiment, a Common P Frame is a forward prediction reference frame. A forward intra-frame prediction encoding algorithm is employed in the encoding process. A reference frame of the common P Frame is a preceding coding frame adjacent to the common P Frame, and/or a preceding I Frame closest to the common P Frame.

The video coding stream includes a plurality of GOPs. Each GOP includes a plurality of coding frames having reference relationship. A GOP may include an I Frame and one or more following refreshment P Frames and one or more following common P Frames in direct or indirect reference relationship with the I Frame, as shown in FIG. 3. In the GOP, the I Frame in the direct or indirect reference relationship with the refreshment P Frames and the common P Frames is called as the reference I Frame.

Figure 2:
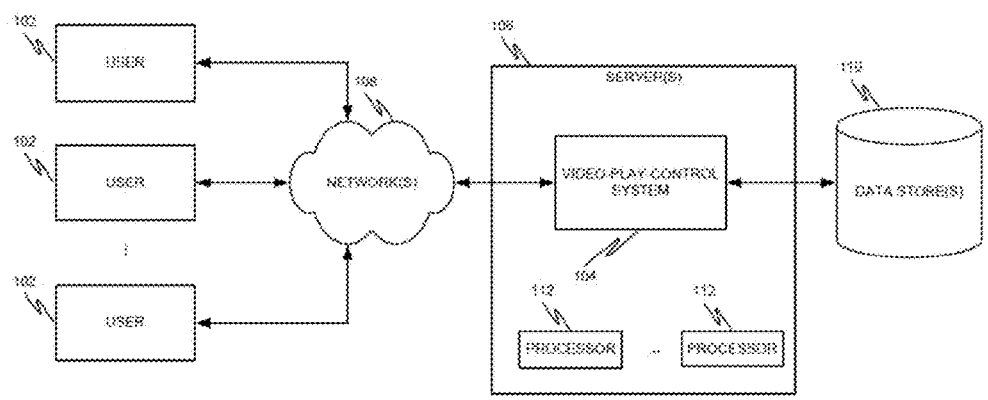
FIG. 2 is an example computer-implemented environment in which users can interact with a video-display-control system hosted on one or more servers through a network, according to one embodiment of the present disclosure.

FIG. 2 is an example computer-implemented environment in which users 102 can interact with a video-display-control system 104 hosted on one or more servers 106 through a network 108, according to one embodiment of the present disclosure. As shown in FIG. 2, the users 102 can interact with the video-display-control system 104 through a number of ways, such as over one or more networks 108. One or more servers 106 accessible through the network(s) 108 can host the video-display-control system 104. The one or more servers 106 may also contain or have access to one or more data stores 110 for storing data for the video-display-control system 104. The one or more servers 106 implement one or more data processors 112. For example, the data processors 112 may be configured for parallel computing.

The video-display-control system 104 can assist the users 102 to improve video encoding to reduce bit rates and decoding consumption. As an example, the video-display-control system 104 can implement an encoding algorithm to generate a coding stream that includes various types of coding frames, such as I Frames, refreshment P Frames and common P Frames. For example, the video-display-control system 104 can reduce decoding resource consumption and achieve fast random access of coding frames, thereby improving decoding efficiency and maintaining smooth display of coding frames without stagnation.

Figure 4:
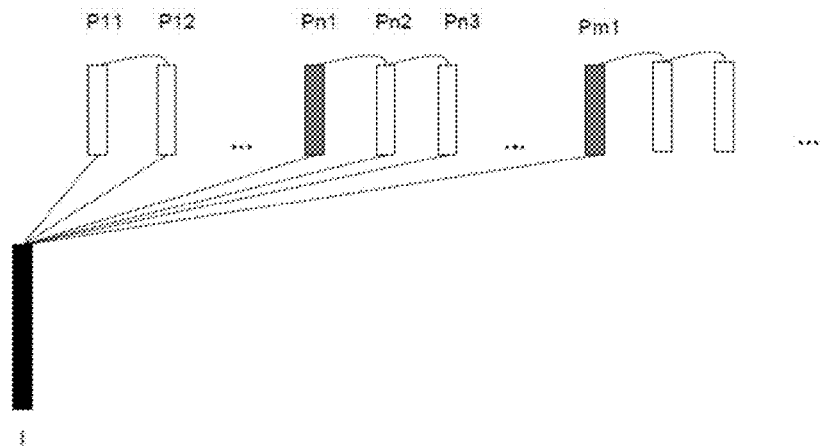
FIG. 4 is an example diagram showing a video coding stream according to one embodiment of the present disclosure.

FIG. 4 is an example diagram showing a video coding stream according to one embodiment of the present disclosure. As shown in FIG. 4, I refers to an I Frame, Pn1 and Pm1 refer to refreshment P Frames, and others are common P Frames. Fast random access can be realized in the video coding stream. For example, when a common P Frame Pn3 is to be accessed, only the I Frame, Pn1, Pn2 and Pn3 in the same GOP are decoded for location. Other intermediate frames (e.g., the intermediate frames P11, P12, . . . before Pn1) are skipped.

As shown in FIG. 3, the interval between two I Frames is relatively large. For example, one I Frame may appear every few minutes, thereby reducing the bit rates. Refreshment P Frames may appear between the two I Frames at intervals, and are decoded only with reference to the I Frames in the GOP. Common P Frames which are small in data size are distributed between the refreshment P Frames in order to further reduce the bit rates.

In some circumstances, if the video coding stream is sent according to the method described herein, or if the coding stream is stored, or if a sending end (e.g., a sending terminal) of the coding stream does not send positioning information to a receiving end (or a decoding end), it is possible to cause great difference between timestamps of the I Frame and the Pn1 frame (a refreshment P Frame), then the retention time during the display of the data corresponding to the I Frame may become too long, thus make the video frozen or abnormal to affect user experience.

Figure 5:
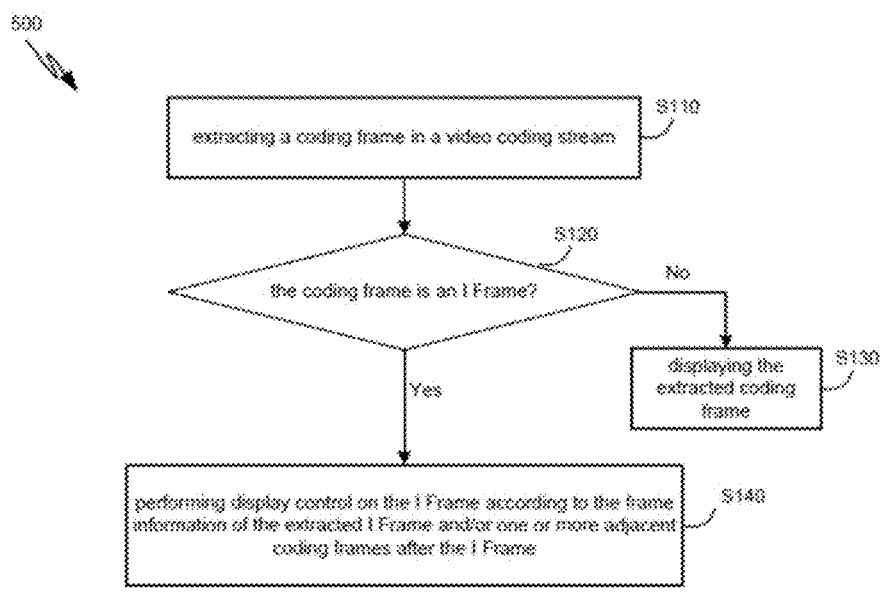
FIG. 5 is an example flow diagram showing a method for display control of a video coding stream according to one embodiment of the present disclosure.

FIG. 5 is an example flow diagram showing a method for display control of a video coding stream according to one embodiment of the present disclosure. For example, the method 500 can be applied to a video coding stream generated according to the encoding method described herein or a video coding stream generated according to a conventional encoding method.

In a coding stream generated using the video encoding method described herein, a timestamp of an I Frame is Ti, and a timestamp of a refreshment P Frame (e.g., Pn1 as shown in FIG. 3) is Tpn1. Then the difference between the timestamps is Td=Tpn1−Ti. Theoretically, the maximum Td can be close to the duration of one GOP, while the duration of the GOP in the coding stream may be several minutes (e.g., the interval between the two I Frames is very long). Under normal circumstances, a general-purpose video player displays according to the timestamps, and the retention time during displaying of the data corresponding to the I Frame (namely displaying of the I Frame) is relatively long, so that user experience is directly affected and the user may have the misunderstanding that software crashes or operates abnormally.

As shown in FIG. 5, the method 500 includes multiple processes. For example, the process S110 includes: extracting a coding frame in a video coding stream. In one embodiment, in the video coding stream (e.g., as shown in FIG. 4), the interval between two consecutive I Frames is very large (e.g., as shown in FIGS. 3 and 4). In some embodiments, the video coding stream can be sent from a sending end (e.g., a sending terminal) to a receiving end (e.g., a receiving terminal) or a decoding end. For example, the decoding end can be a general-purpose video player, etc. For example, the coding stream sent from the sending end can be received at the receiving end sequentially, such as, the I Frame, the Pn1 frame (a refreshment P Frame), Pn2 frame, Pn3 frame (e.g., as shown in FIG. 4).

The process S120 includes: determining whether the coding frame extracted from the received video coding stream is an I Frame. In one embodiment, the receiving end sequentially receives the coding frames in the coding stream and can extract and detect the coding frames in the coding stream one by one, such as the I Frame, the Pn1 frame (a refreshment P Frame), the Pn2 frame, the Pn3 frame, etc. The type of the coding frame or other information can be determined based at least in part on frame information of the I Frame and the Pn1 frame (e.g., the adjacent coding frames after the I Frame when the coding stream is actually stored). For example, the frame information of the coding frame includes a tag of the type of the coding frame for determining whether the coding frame is the I Frame. Other information may also be used for determining the type of the extracted coding frame, for example, position, serial number, data volume, etc.

In some embodiments, the frame information includes, but is not limited to, timestamp, serial number, relevant tag, display control command, display configuration information, etc. For example, a timestamp is a character sequence and can uniquely identify a certain time. Each frame of data has the timestamp. The serial number is a frame number of the coding frame. The relevant tag refers to a tag on an encapsulation layer or an encoding layer for identifying the type of the coding stream or the frame type. The display control command refers to positioning information that includes a timestamp of the target frame, the frame number and other information. The positioning information is used for identifying the positioned target information without affecting the timestamp of the coding frame. The display configuration information refers to a display control operation which is performed by an application layer on the I Frame. In some embodiments, the determination process includes a detection process for sequentially acquiring and detecting the coding frames in the incoming coding stream one by one and determining whether each coding frame is the I Frame.

The process S130 includes: if the coding frame extracted from the received video coding stream is not an I Frame, displaying the extracted coding frame. In one embodiment, if the coding frame extracted in the process S110 is determined to not be the I Frame, then the coding frame can be normally decoded. As an example, the data (such as picture data of video) corresponding to the coding frame after decoding is displayed by a video player to be watched by the user who requests access to the coding stream. The audio data of the video may be synchronously played by a player together with the picture data of the video via a speaker.

The process S140 includes: if the coding frame extracted from the received video coding stream is an I Frame, performing display control on the I Frame according to the frame information of the extracted I Frame and/or one or more adjacent coding frames after the I Frame. In one embodiment, if the extracted coding frame is determined to be an I Frame in the process S120, then the displaying preprocessing can be firstly performed on the I Frame. As an example, whether the data (such as picture data) corresponding to the I Frame needs to be finally displayed is determined.

Whether the I Frame needs to be displayed may be determined (e.g., including determination after certain computation) according the coding stream information of the video coding stream, the frame information of the coding frame of the video coding stream (e.g., including the relevant tag of the coding frame), the configuration condition (e.g., configuration information) and/or the related command in the transmission process, etc.

For example, the coding stream information of the coding stream comprises frame rate information. As an example, the coding stream and/or the coding frames in the coding stream include various tags (e.g., relevant tags) set in the encoding layer or the encapsulation layer during encapsulation. In another example, the coding frames include certain frame information (e.g., timestamps, serial numbers, etc.).

In some embodiments, whether to finally display the I Frame may be determined by comparing the difference between the timestamps (e.g., timestamps of the I Frame and the adjacent coding frame after the I Frame) with a preset threshold, comparing the sizes of the timestamps (e.g., timestamps of the I Frame and the adjacent coding frame after the I Frame), determining whether the difference between the timestamps exceeds an error range of allowable difference between the timestamps and acquiring the relevant tag, the related command, etc., for determining whether to display the coding frame. In some embodiments, in the transmission process, the sending end can also provide the related command, such as the command about whether to display a related I Frame for each coding frame so as to control the corresponding coding frame to be displayed.

Alternatively, when a coding frame is detected/extracted and determined to be an I Frame, the configuration information is preset and whether to display the coding frame is provided. For example, the receiving end provides the configuration information. In some embodiments, in the process of acquiring the coding stream to be played, it is indicated that the coding frame detected or determined to be a first I Frame of the coding stream is not to be displayed. In some embodiments, it is indicated that other specific I Frames, such as the I Frames with odd serial numbers are not to be displayed. For example, the coding frame which is detected or determined to be an I Frame and has an odd serial number (e.g., 1, 3, 5, etc.) in the frame information is not to be displayed.

Certain example display control algorithms or certain example display control conditions related to the process S140 are described in FIGS. 6-12.

Figure 6:
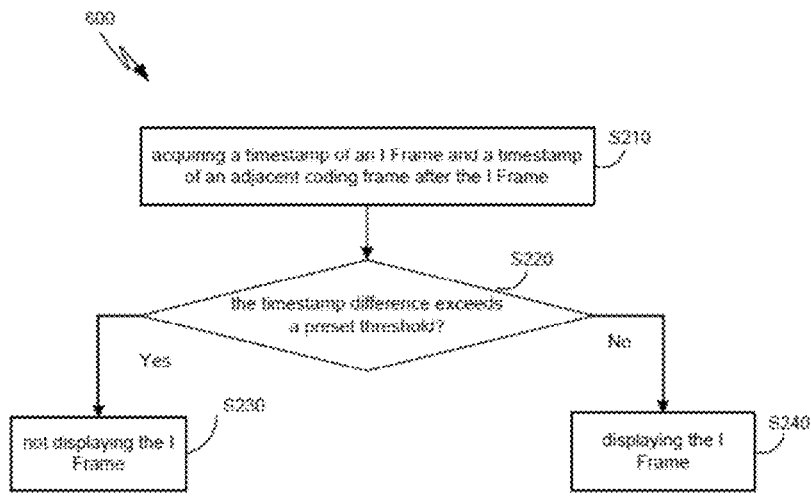
FIG. 6 is an example flow diagram showing a method for I Frame display control of a video coding stream based at least in part on timestamp difference according to one embodiment of the present disclosure.

FIG. 6 is an example flow diagram showing a method for I Frame display control of a video coding stream based at least in part on timestamp difference according to one embodiment of the present disclosure. For example, the video-display-control system 104 implements the method 600 to determine whether to display an I Frame based at least in part on a timestamp of an I Frame and a timestamp of an adjacent coding frame that follows the I Frame. The method 600 includes multiple processes.

The process S210 includes: acquiring a timestamp of an I Frame and a timestamp of an adjacent coding frame after the I Frame. For example, the frame information of the I Frame contains the timestamp (e.g., Ti). The frame information of the adjacent coding frame after the I Frame (e.g., the refresh frame Pn1) contains the timestamp (e.g., Tpn1).

The process S220 includes: determining whether a difference between the timestamp of the I Frame and the timestamp of the adjacent coding frame after the I Frame exceeds a preset threshold. For example, based on the difference (such as Td) between the timestamp of the I Frame (such as Ti) and the timestamp of the adjacent coding frame after the I Frame (such as Tpn1), the difference between the timestamp of the I Frame and the timestamp of the adjacent coding frame after the I Frame (such as Td=Tpn1−Ti) is acquired by computation and whether the difference exceeds the preset threshold is determined. As an example, the threshold can be preset according to a statistical analysis algorithm, user experience, favorability and other demands. The difference is compared with the preset threshold, and whether the difference is more than or no less than the threshold is determined. For example, the threshold is preset to be 2 seconds, and whether Td is more than or no less than 2 seconds is determined. Here, the exceeding of the threshold may be set to be more than or no less than the threshold.

The process S230 includes: if the difference is determined to exceed the threshold, not displaying the I Frame. The process S240 includes: if the difference is determined to not exceed the threshold, displaying the I Frame. Whether to display the I Frame is controlled according to the determination result. For example, if the difference Td is more than or no less than the threshold 2 seconds, then the I Frame is not displayed. If Td does not exceed the threshold (e.g., Td is no more than or less than the threshold 2 seconds), the I Frame is displayed. Thus, before displaying an I Frame, whether the I Frame is to be displayed is determined so as to avoid a long retention time during the displaying of the I Frame.

Figure 7:
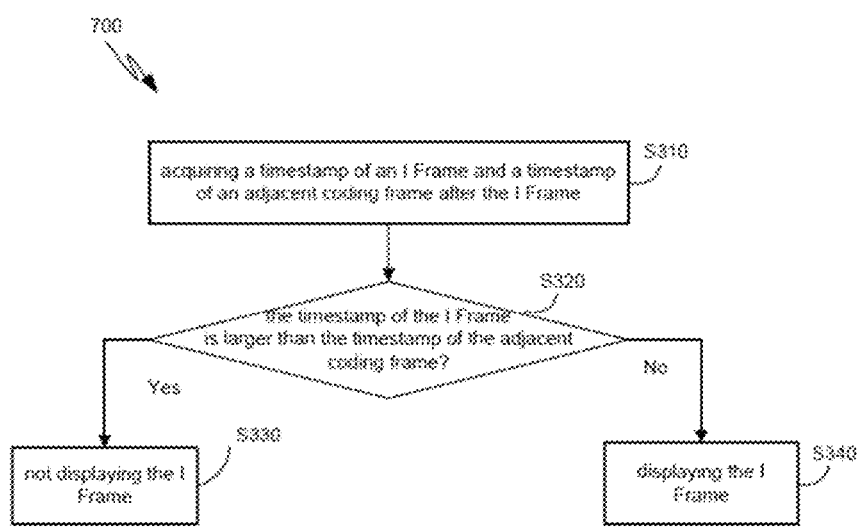
FIG. 7 is an example flow diagram showing a method for I Frame display control of a video coding stream based at least in part on timestamp difference according to another embodiment of the present disclosure.

FIG. 7 is an example flow diagram showing a method for I Frame display control of a video coding stream based at least in part on timestamp difference according to another embodiment of the present disclosure. For example, the video-display-control system 104 implements the method 700 to determine whether to display an I Frame based at least in part on a timestamp of an I Frame and a timestamp of an adjacent coding frame that follows the I Frame. The method 700 includes multiple processes.

The process S310 includes: acquiring a timestamp of an I Frame and a timestamp of an adjacent coding frame after the I Frame. As an example, the process S310 is the same as the process S210.

The process S320 includes: determining whether the timestamp of the I Frame is larger than the timestamp of the adjacent coding frame after the I Frame. The timestamp of the I Frame is compared with the timestamp of the adjacent coding frame after the I Frame to determine whether the timestamp of the I Frame is larger than the timestamp of the adjacent coding frame after the I Frame. As an example, whether Ti of the I Frame is not less than Tpn1 of the adjacent Pn1 frame after the I Frame is determined.

The process S330 includes: if the timestamp of the I Frame is determined to be larger than the timestamp of the adjacent coding frame after the I Frame, then not displaying the I Frame. The process S340 includes: if the timestamp of the I Frame is determined to not exceed the timestamp of the adjacent coding frame after the I Frame, then displaying the I Frame. Under normal circumstances, the timestamp of the I Frame is smaller than the timestamps of other coding frames in the GOP that contains the I Frame. For example, if the timestamp of the I Frame is large, it may indicate an abnormality. In another example, if a certain I Frame is not to be displayed, the related timestamp can be modified.

In one embodiment, whether to display the I Frame is controlled according to the determination result. For example, when Ti is not less than Tpn1, the I Frame is not displayed. In another example, when Ti is less than Tpn1, the I Frame is displayed. Thus, before displaying an I Frame, whether the I Frame is to be displayed is determined so as to avoid a long retention time during the displaying of the I Frame.

Figure 8:
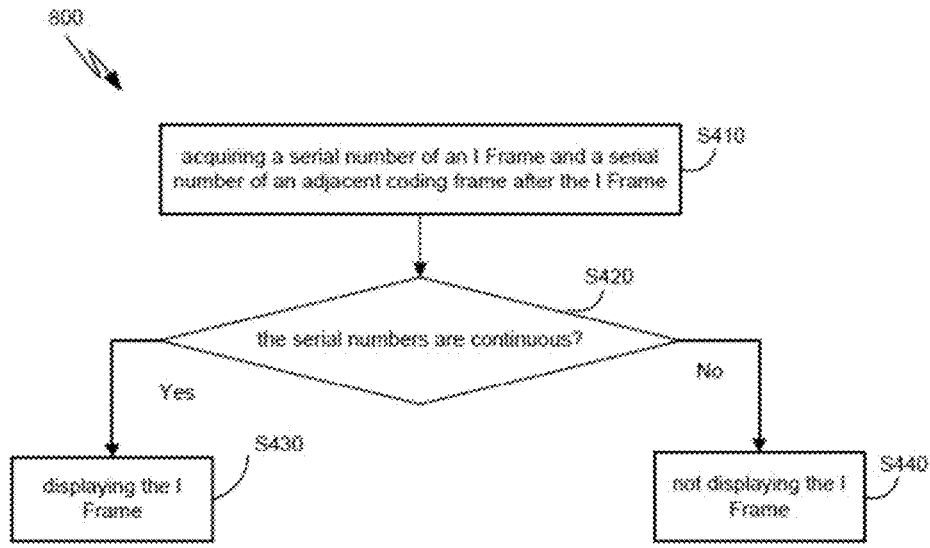
FIG. 8 is an example flow diagram showing a method for I Frame display control of a video coding stream based at least in part on serial numbers according to an embodiment of the present disclosure.

FIG. 8 is an example flow diagram showing a method for I Frame display control of a video coding stream based at least in part on serial numbers according to an embodiment of the present disclosure. For example, the video-display-control system 104 implements the method 800 to determine whether to display an I Frame based at least in part on a serial number of an I Frame and a serial number of an adjacent coding frame that follows the I Frame. The method 800 includes multiple processes.

The process S410 includes: acquiring a serial number of an I Frame and a serial number of an adjacent coding frame after the I Frame. For example, the frame information of each coding frame contains the serial number representing the sequence of the coding frame in the coding stream. The frame information of the I Frame contains the serial number. When the coding stream is stored, the adjacent coding frame after the I Frame in each GOP can be the refreshment P Frame, and the frame information of the refreshment P Frame also contains the serial number of the refreshment P Frame. For example, the serial number of the I Frame is 1, which is arranged according to the sequence of actual numbers. The adjacent coding frame after the I frame is the refresh frame Pn1, and the serial number can be 2.

In some embodiments, serial numbers of adjacent frames can also be set according to a sequence interval of 10. For example, in one GOP, the serial number of the I Frame is 100, and the serial number of the adjacent coding frame after the I Frame, namely the refreshment P Frame, is 110. The serial number of the adjacent coding frame after the refreshment P Frame is 120, and so on. In some embodiments, the serial numbers of the coding frames can be set in different ways as long as the serial numbers are well set when the coding frames are stored. For example, rules for continuous serial numbers can be preset. In the above-noted two examples, the serial numbers 1, 2, 3 . . . , are continuous, and the serial numbers 110, 120, 130 . . . , are also considered continuous.

The process S420 includes: determining whether the serial number of the I Frame and the serial number of the adjacent coding frame after the I Frame are continuous according to one or more preset rules for continuous serial numbers. For example, the I Frame and the acquired coding frame after the I Frame, namely the refreshment P Frame, can be adjacent coding frames. The serial numbers of the two adjacent frames are continuous under normal circumstances. As an example, the serial numbers of the adjacent frames can be I Frame: 1, Pn1 frame (a refreshment P Frame): 2, Pn2 frame: 3 . . . .

The process S430 includes: if the serial number of the I Frame and the serial number of the adjacent coding frame after the I Frame are determined to be continuous according to the preset rules, displaying the I Frame. The process S440 includes: if the serial number of the I Frame and the serial number of the adjacent coding frame after the I Frame are determined not to be continuous according to the preset rules, not displaying the I Frame.

For example, the serial number of a current I Frame is 1, and the serial number of the received nearest coding frame after the I Frame is 5. These two frames may not be adjacent frames in the coding stream. The nearest coding frame is not a refreshment P Frame in the GOP that contains the I Frame. That is, the nearest coding frame may not be associated with the I Frame. Thus, the current I Frame may be related to an abnormally long retention, and the I Frame is not to be displayed.

In another example, the serial number of the I Frame is 1, and the serial number of the acquired nearest coding frame after the I Frame is 2. The nearest coding frame after the I Frame may be a refreshment P Frame that follows the I Frame (e.g., the Pn1 frame). These two frames are adjacent within a same GOP, and the refreshment P Frame (e.g., the Pn1 frame) follows the I Frame. Thus, the I Frame is displayed.

Figure 9:
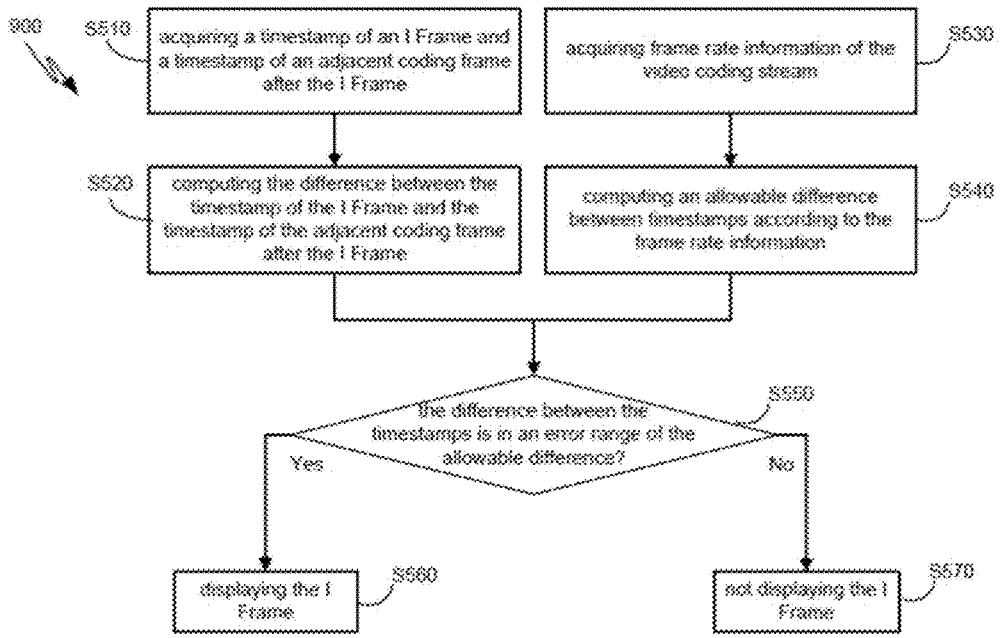
FIG. 9 is an example flow diagram showing a method for I Frame display control of a video coding stream based at least in part on timestamp difference and frame rate information according to an embodiment of the present disclosure.

FIG. 9 is an example flow diagram showing a method for I Frame display control of a video coding stream based at least in part on timestamp difference and frame rate information according to an embodiment of the present disclosure. For example, the video-display-control system 104 implements the method 900 to determine whether to display an I Frame based at least in part on timestamps and frame rates of an I Frame and an adjacent coding frame that follows the I Frame. As an example, the frame rate is a measure for a number of display frames and represents frames per second (referred to as FPS) or "Hertz" (Hz). The method 900 includes multiple processes.

The process S510 includes: acquiring a timestamp of an I Frame and a timestamp of an adjacent coding frame after the I Frame. For example, the process S510 is the same as the process S210. If the frame information of the I Frame contains the timestamp Ti, then the frame information of the adjacent refresh frame Pn1 after the I Frame contains the timestamp Tpn1.

The process S520 includes: computing a difference between the timestamp of the I Frame and the timestamp of the adjacent coding frame after the I Frame. For example, the process S520 is the same as the process S220. As an example, the difference between the timestamps is determined as Td=Tpn1-Ti according to the acquired timestamps.

The process S530 includes: acquiring frame rate information of the video coding stream. For example, coding stream information of the video coding stream includes the frame rate information. The process S540 includes: computing an allowable difference between timestamps according to the acquired frame rate information. For example, the frame rate is f=25. The difference between timestamps of two frames (e.g., I Frame and the adjacent coding frame after the I Frame, namely the refresh frame Pn1) is determined to be Tf=1000 ms (1 s)/25 (frame rate)=40 ms (e.g., duration of each frame). Then, Tf is the allowable difference between the timestamps.

In some embodiments, a fluctuation of ±10% of the allowable difference between the timestamps can be set on the basis of the allowable difference (e.g., 40 ms) between the timestamps. For example, a range of 36 ms-44 ms is reasonable. In some embodiments, the allowable positive and negative errors can be customized by the user. For example, the processes S510 and S530 can be executed in any order or simultaneously.

The process S550 includes: determining whether the difference between the timestamp of the I Frame and the timestamp of the adjacent coding frame after the I Frame is in an error range of the allowable difference. For example, the difference between the timestamps is compared with the allowable difference to determine whether the difference between the timestamps is in the error range of the allowable difference.

In some embodiments, the difference between the timestamps according to the I Frame and the adjacent coding frame after the I Frame is compared with the error range of the allowable difference acquired by computation according to the frame rate information. For example, whether the difference between the timestamps Td is within the error range of Tf can be determined.

The process S560 includes: if the difference between the timestamps is in the error range of the allowable difference, displaying the I Frame. The process S570 includes: if the difference between the timestamps is out of the error range of the allowable difference, not displaying the I Frame. For example, if the difference between the timestamps of the I Frame and the refresh frame Pn1 is in the range of the allowable difference (e.g., 40 ms with an error range of ±10%), namely Td<Tf, then the I Frame is displayed. If the difference between the timestamps of the I Frame and the refresh frame Pn1 is out of the range of the allowable difference (e.g., 40 ms with an error range of ±10%), namely Td>Tf, then the I Frame is not displayed.

Figure 10:
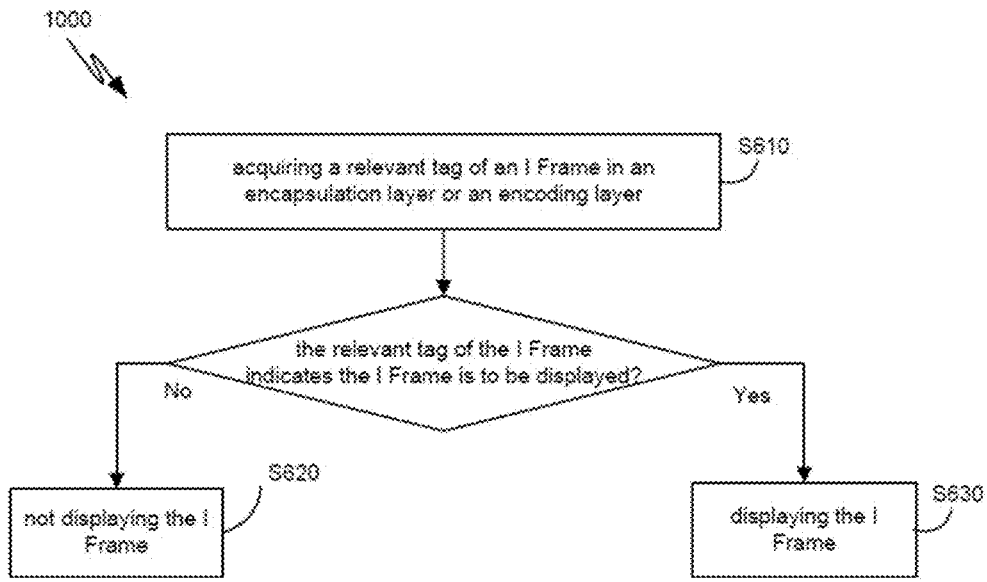
FIG. 10 is an example flow diagram showing a method for I Frame display control of a video coding stream based at least in part on relevant tags according to an embodiment of the present disclosure.

FIG. 10 is an example flow diagram showing a method for I Frame display control of a video coding stream based at least in part on relevant tags according to an embodiment of the present disclosure. For example, the video-display-control system 104 implements the method 1000 to determine whether to display an I Frame based at least in part on a relevant tag of an I Frame. The method 1000 includes multiple processes.

The process S610 includes: acquiring a relevant tag of an I Frame in an encapsulation layer or an encoding layer. For example, the video coding stream is encapsulated after encoding. For the coding stream, a relevant tag can be added in the encapsulation layer or the encoding layer for the coding stream or each coding frame in the coding stream. In one embodiment, the relevant tag includes a display tag which is used for identifying the type of a coding frame or for identifying the certain coding frame as to be displayed/not displayed.

The process S620 includes: in the encapsulation layer or the encoding layer, if the relevant tag of the I Frame indicates that the I Frame is not to be displayed, then not displaying the I Frame. The process S630 includes: if the relevant tag of the I Frame indicates that the I Frame is to be displayed, then displaying the I Frame. For example, if the I Frame has a relevant tag of not being displayed in either the encapsulation layer or the encoding layer, then the I Frame is not to be displayed.

Figure 11:
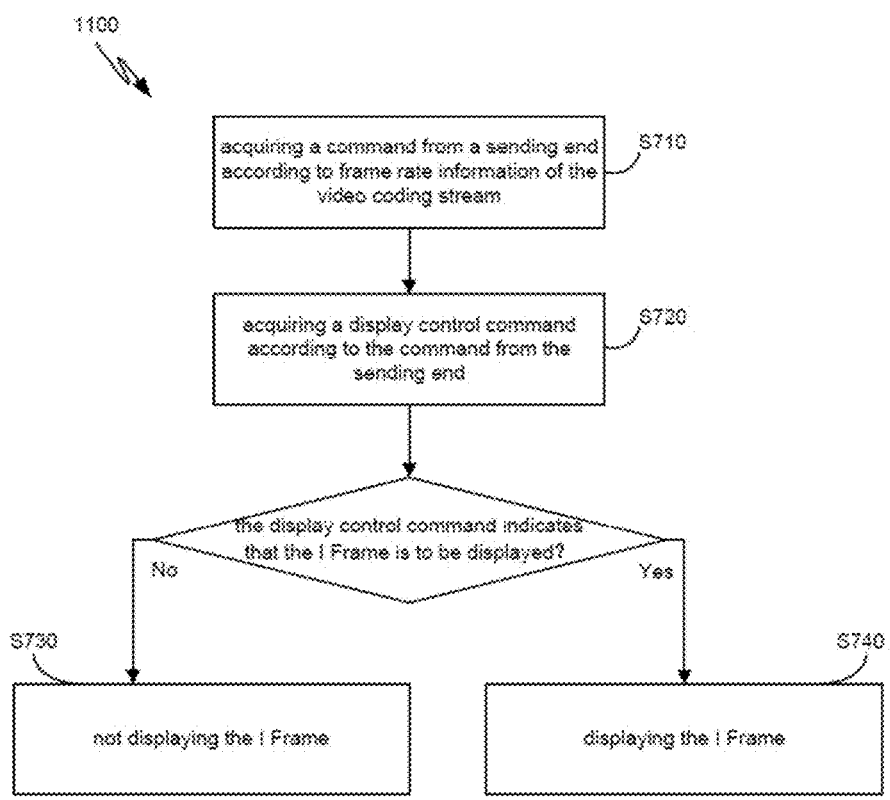
FIG. 11 is an example flow diagram showing a method for I Frame display control of a video coding stream based at least in part on commands according to an embodiment of the present disclosure.

FIG. 11 is an example flow diagram showing a method for I Frame display control of a video coding stream based at least in part on commands according to an embodiment of the present disclosure. For example, the video-display-control system 104 implements the method 1100 to determine whether to display an I Frame based at least in part on certain commands. As an example, a command may be related to a coding frame and is provided by a sending end of the video coding stream in the transmission process, and the command may indicate whether to display the coding frame. The method 1100 includes multiple processes.

The process S710 includes: acquiring a command from a sending end according to frame rate information of the video coding stream. For example, when the sending end sends the coding stream to a receiving end (a decoding end), such as a general-purpose video player, corresponding frame rate information is carried in the coding stream. As an example, the frame rate information includes the command from the sending end for allowing the receiving end to complete reception, storage, decoding, displaying and other treatments of the coding stream.

The process S720 includes: acquiring a display control command according to the command from the sending end. In one embodiment, the command from the sending end includes a display control command for controlling or identifying a certain coding frame to be displayed or not to be displayed.

The process S730 includes: if the display control command indicates that the I Frame is not to be displayed, then not displaying the I Frame. The process S740 includes: if the display control command indicates that the I Frame is to be displayed, then displaying the I Frame.

In some embodiments, when the sending end sends the video coding stream, the corresponding command from the sending end exists in the frame rate information and a display control command exists in the command from the sending end. According to the display control command, a certain I Frame in the coding stream can be controlled to be displayed or not to be displayed in real-time. For example, in the transmission process of the coding stream, the sending end can synchronously send the display control command for the coding stream, and the display control command controls if the I Frame is to be displayed in real-time.

Figure 12:
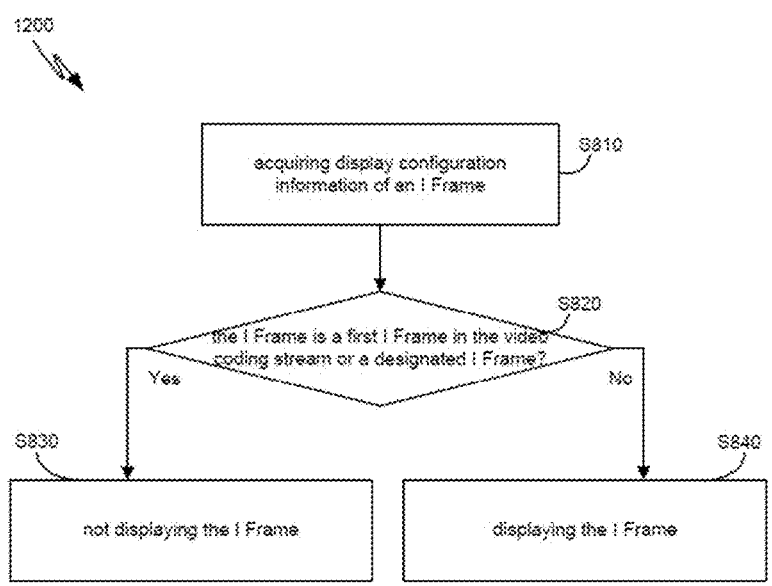
FIG. 12 is an example flow diagram showing a method for I Frame display control of a video coding stream based at least in part on configuration information according to an embodiment of the present disclosure.

FIG. 12 is an example flow diagram showing a method for I Frame display control of a video coding stream based at least in part on configuration information according to an embodiment of the present disclosure. For example, the video-display-control system 104 implements the method 1200 to determine whether to display an I Frame based at least in part on configuration information of an I Frame. The method 1200 includes multiple processes.

The process S810 includes: acquiring display configuration information of an I Frame. For example, the display configuration information of the I Frame is preset and used for controlling a first I Frame in the video coding stream or a designated I Frame not to be displayed.

The process S820 includes: determining whether the I Frame is a first I Frame in the video coding stream or a designated I Frame according to the display configuration information. In this process, an I Frame is not to be displayed according to the preset display configuration information. For example, before a coding frame extracted from the incoming coding stream is detected or determined to be an I Frame, the display configuration information is preset as follows: the first I Frame in the incoming coding stream is not displayed, or a designated I Frame is not displayed (e.g., the I Frame with an odd serial number in the incoming coding stream is not displayed).

As an example, the display configuration information can be related to frame information and coding stream information (e.g., frame rate information, layer information, etc.). As another example, whether an I Frame is designated can be determined by comparing the serial number, the timestamp, or other information, in the frame information of the I Frame to one or more designated conditions in the display configuration information.

The process S830 includes: if the I Frame is the first I Frame in the video coding stream or if the I Frame is designated according to the display configuration information, not displaying the I Frame. The process S840 includes: if the I Frame is not the first I Frame in the video coding stream or if the I Frame is not designated according to the display configuration information, then displaying the I Frame.

In some embodiments, certain execution conditions of I Frame display control in the process S140 (e.g., as in FIGS. 6-12) can be used, singly or in any combination, as the condition for I Frame display. In one embodiment, difference between timestamps (e.g., as shown in FIG. 6) and serial numbers (e.g., as shown in FIG. 7) can be combined as the conditions for determining whether to display an I Frame. As an example, whether the serial numbers are continuous is determined. If the serial numbers are continuous, then whether the difference between the timestamps is below a threshold is determined. If the difference between the timestamps exceeds the threshold, the I Frame is not to be displayed even if the serial numbers are continuous. As another example, if the serial numbers are not continuous, the I Frame cannot be displayed.

Figure 13:
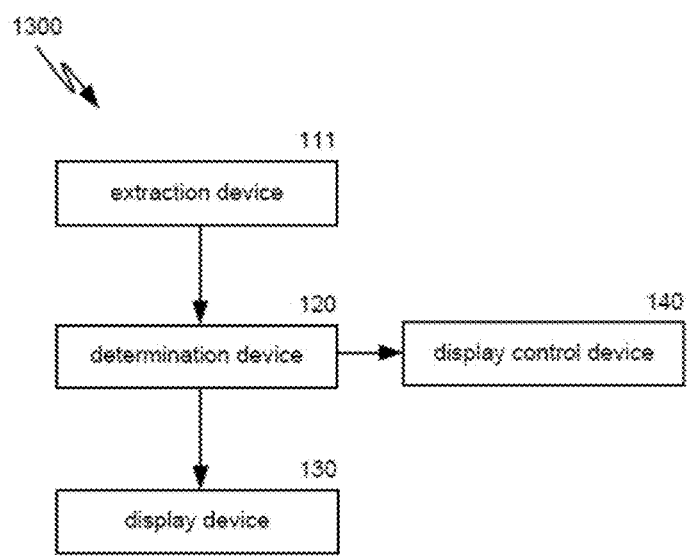
FIG. 13 is an example diagram for a system for video display control according to one embodiment of the present disclosure.
Figure 14:
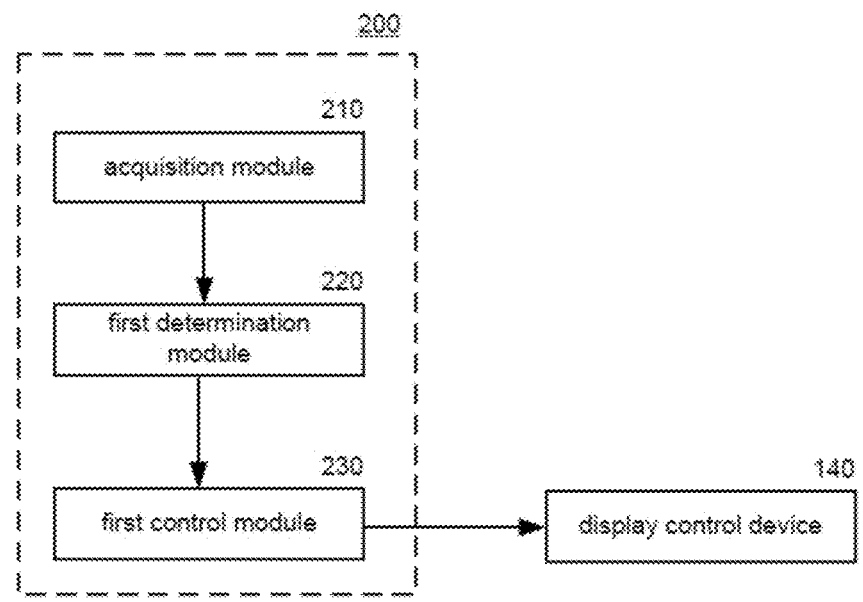
FIGS. 14-20 are example diagrams for a display control device 140 as part of the video-display-control system as shown in FIG. 13 according to some embodiments of the present disclosure.
Figure 15:
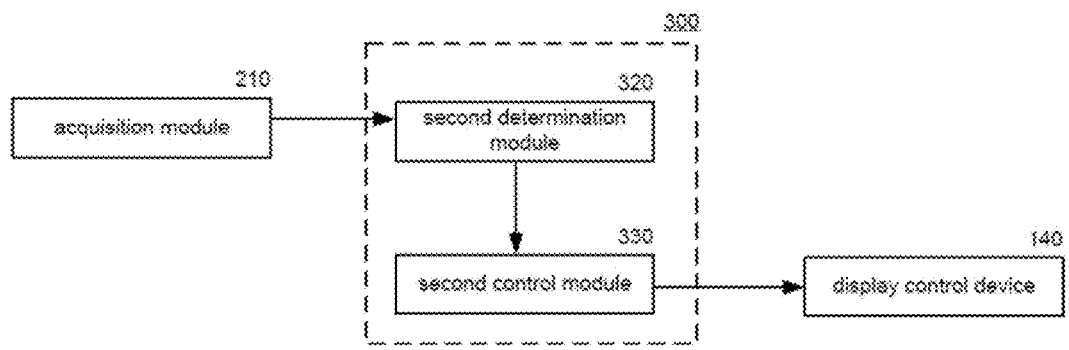
Figure 16:
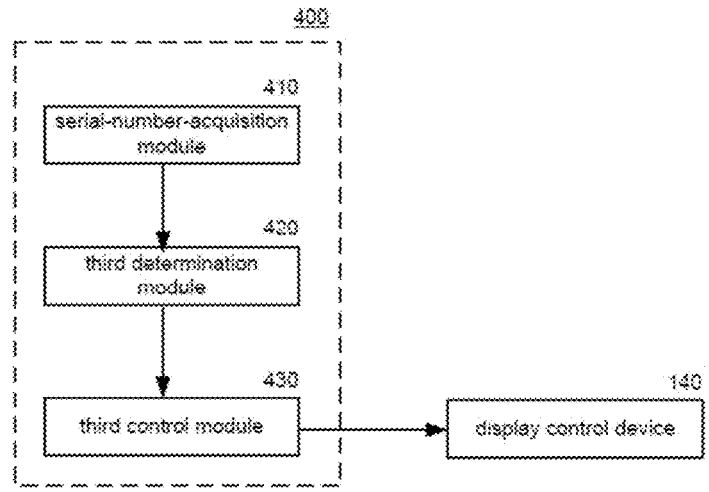
Figure 17:
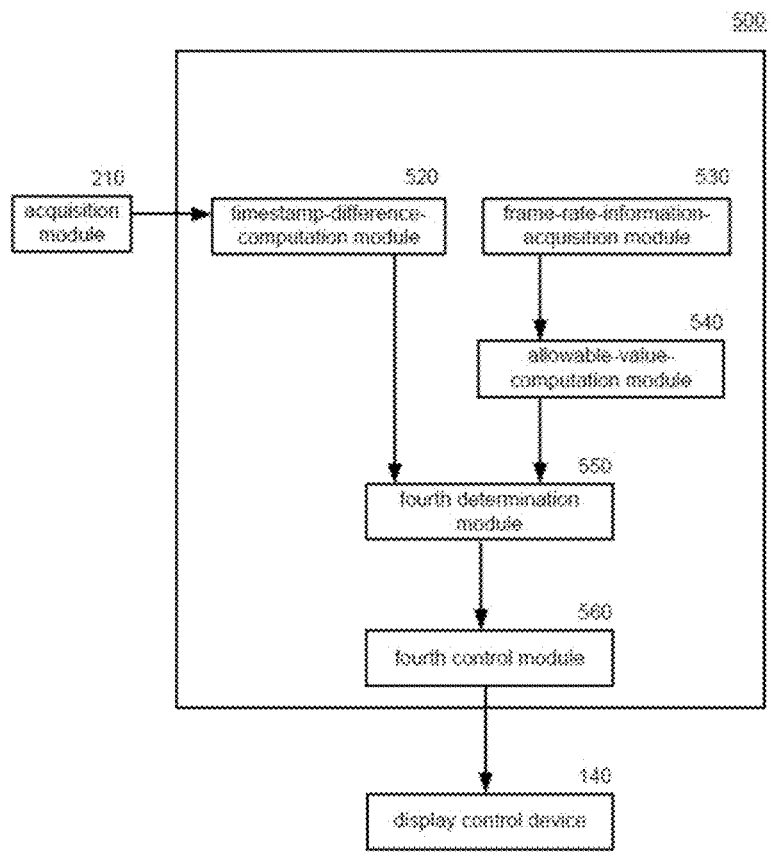
Figure 18:
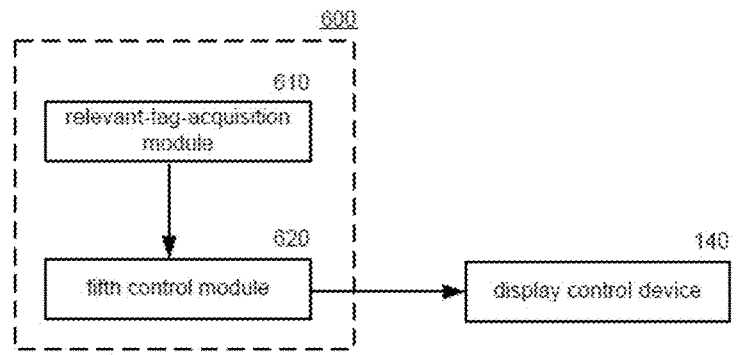
Figure 19:
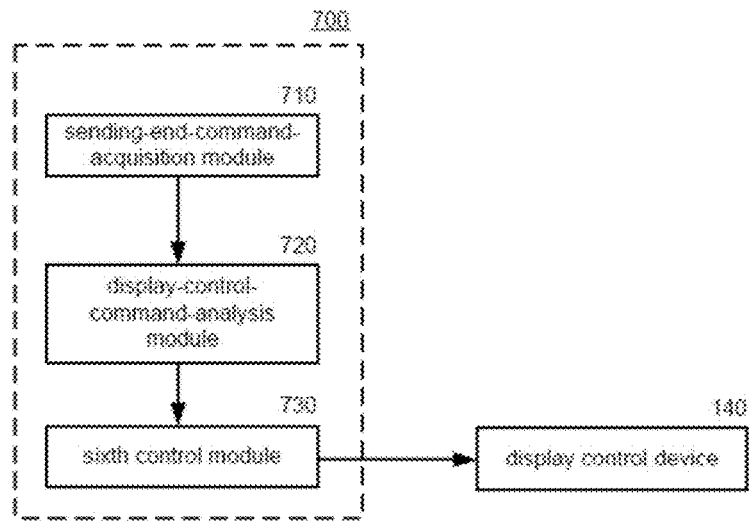
Figure 20:
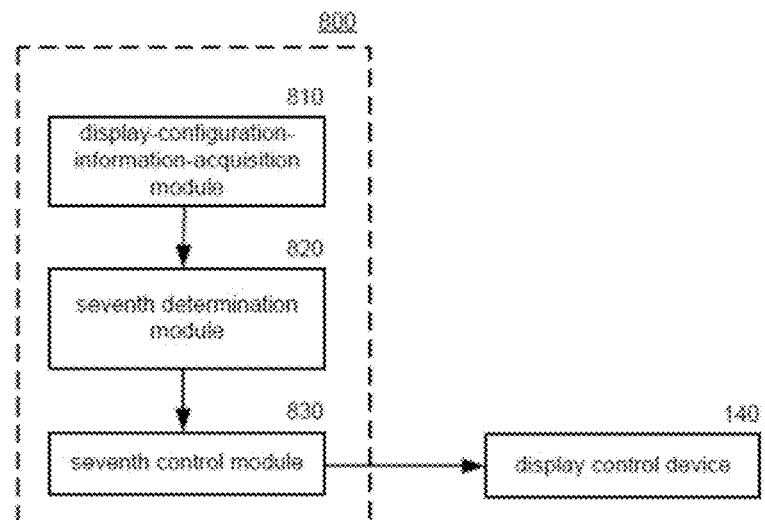

FIG. 13 is an example diagram for a system for video display control according to one embodiment of the present disclosure. As shown in FIG. 13, the system 1300 includes an extraction device 111, a determination device 120, a display device 130 and a display control device 140.

According to one embodiment, the extraction device 111 is configured to extract a coding frame in a video coding stream. For example, the extraction device 111 implements the process S110. The determination device 120 is connected with the extraction device 111, and configured to determine whether the extracted coding frame is an I Frame. As an example, the determination device 120 implements the process S120.

According to another embodiment, the display device 130 is connected with the determination device 120, and configured to display the extracted coding frame if the extracted coding frame is not an I Frame. For example, the display device 130 implements the process S130. The display control device 140 is connected with the determination device 120, and configured to, if the coding frame extracted from the received video coding stream is an I Frame, perform display control on the I Frame according to the frame information of the extracted I Frame and/or one or more adjacent coding frames after the I Frame. As an example, the display control device 140 implements the process S140. Specifically, the display control device 140 implements certain display control algorithms or certain display control conditions related to the process S140 as shown in FIGS. 6-12.

FIGS. 14-20 are example diagrams for the display control device 140 according to some embodiments of the present disclosure. As shown in FIGS. 14-20, the described display control device 140 includes: a first timestamp device 200, a second timestamp device 300, a serial-number device 400, a frame-rate-and-timestamp device 500, a relevant-tag device 600, a display-control-command device 700 and a display-configuration information device 800.

In some embodiments, the first timestamp device 200 implements the method 600. In one embodiment, the first timestamp device 200 includes: an acquisition module 210 configured to acquire the timestamp of the I Frame and the timestamp of the adjacent coding frame after the I Frame. As an example, the acquisition module 210 implements the process S210.

In another embodiment, the first timestamp device 200 includes: a first determination module 220 configured to determine whether the difference between the timestamp of the I Frame and the timestamp of the adjacent coding frame after the I Frame exceeds a preset threshold. For example, based on the difference (such as Td) between the timestamp of the I Frame (such as Ti) and the timestamp of the adjacent coding frame after the I Frame (such as Tpn1), the difference between the timestamp of the I Frame and the timestamp of the adjacent coding frame after the I Frame (such as Td=Tpn1-Ti) is acquired by computation and whether the difference exceeds the preset threshold is determined. As an example, the first determination module 220 implements the process S220.

In yet another embodiment, the first timestamp device 200 includes: a first control module 230 configured to not display the I Frame if the determination result of the first determination module 220 is that the difference between the timestamps exceeds the threshold; and display the I Frame if the determination result of the first determination module 220 is that the difference between the timestamps does not exceed the threshold. As an example, the first control module 230 implements the process S230 and the process S240.

In some embodiments, the second timestamp device 300 implements the method 700. In one embodiment, the second timestamp device 300 includes: a second determination module 320 connected with the acquisition module 210 and configured to determine whether the timestamp of the I Frame acquired by the acquisition module 210 is larger than the timestamp of the adjacent coding frame after the I Frame. For example, the second determination module 320 implements the process S320.

In another embodiment, the second timestamp device 300 includes: a second control module 330 configured not to display the I Frame if the determination result of the second determination module 320 is that the timestamp of the I Frame exceeds the timestamp of the adjacent coding frame after the I Frame; and display the I Frame if the determination result of the second determination module 320 is that the timestamp of the I Frame does not exceed the timestamp of the adjacent coding frame after the I Frame. For example, the second control module 330 implements the process S330 and the process S340.

In some embodiments, the serial-number device 400 implements the method 800. In one embodiment, the serial-number device 400 includes: a serial-number-acquisition module 410 configured to acquire the serial number of the I Frame and the serial number of the adjacent coding frame after the I Frame. As an example, the serial-number-acquisition module 410 implements the process S410.

In another embodiment, the serial-number device 400 includes: a third determination module 420 configured to determine whether the serial number of the I Frame and the serial number of the adjacent coding frame after the I Frame are continuous according to the preset rules for continuous serial numbers. As an example, the third determination module 420 implements the process S420.

In yet another embodiment, the serial-number device 400 includes: a third control module 430 configured not to display the I Frame if the determination result of the third determination module 420 is that the serial number of the I Frame and the serial number of the adjacent coding frame after the I Frame are not continuous; and display the I Frame if the determination result of the third determination module 420 is that the serial numbers are continuous. As an example, the third control module 430 implements the process S430 and the process S440.

In some embodiments, the frame-rate-and-timestamp device 500 implements the method 900. In one embodiment, the frame-rate-and-timestamp device 500 includes: a timestamp-difference-computation module 520 connected with the acquisition module 210 and configured to compute the difference between the timestamp of the I Frame and the timestamp of the adjacent coding frame after the I Frame. As an example, the timestamp-difference-computation module 520 implements the process S520.

In another embodiment, the frame-rate-and-timestamp device 500 includes: a frame-rate-information-acquisition module 530 configured to acquire the frame rate information of the video coding stream. As an example, the frame-rate-information-acquisition module 530 implements the process S530. In yet another embodiment, the frame-rate-and-timestamp device 500 includes: an allowable-value-computation module 540 configured to compute an allowable difference between the timestamps according to the acquired frame rate information. As an example, the allowable-value-computation module 540 implements the process S540.

In another embodiment, the frame-rate-and-timestamp device 500 includes: a fourth determination module 550 configured to determine whether the difference between the timestamps is in the error range of the allowable difference between the timestamps. As an example, the fourth determination module 550 implements the process S550.

In another embodiment, the frame-rate-and-timestamp device 500 includes: a fourth control module 560 configured to display the I Frame if the difference between the timestamps is in the error range of the allowable difference between the timestamps, and not to display the I Frame if the difference is out of the error range of the allowable difference between the timestamps. As an example, the fourth control module 560 implements the process S560 and the process S570.

In some embodiments, the relevant-tag device 600 implements the method 1000. In one embodiment, the relevant-tag device 600 includes: a relevant-tag-acquisition module 610 configured to acquire the relevant tag of the I Frame in an encapsulation layer or an encoding layer. As an example, the relevant-tag-acquisition module 610 implements the process S610.

In another embodiment, the relevant-tag device 600 includes: a fifth control module 620 configured not to display the I Frame if the relevant tag of the I Frame in the encapsulation layer or the encoding layer indicates that the I Frame is to be displayed, and display the I Frame if the relevant tag of the I Frame indicates that the I Frame is to be displayed. As an example, the fifth control module 620 implements the process S620 and the process S630.

In some embodiments, the display-control-command device 700 implements the method 1100. In one embodiment, the display-control-command device 700 includes: a sending-end-command-acquisition module 710 configured to acquire a command from the sending end according to frame rate information of the video coding stream. As an example, the sending-end-command-acquisition module 710 implements the process S710.

In another embodiment, the display-control-command device 700 includes: a display-control-command-analysis module 720 configured to acquire a display control command according to the command from the sending end. As an example, the display-control-command-analysis module 720 implements the process S720.

In another embodiment, the display-control-command device 700 includes: a sixth control module 730 configured to, if the display control command indicates that the I Frame is not to be displayed, not display the I Frame; and if the display control command indicates that the I Frame is to be displayed, display the I Frame. As an example, the sixth control module 730 implements the process S730 and the process S740.

In some embodiments, the display-configuration information device 800 implements the method 1200. In one embodiment, the display-configuration information device 800 includes: a display-configuration information-acquisition module 810 configured to acquire display configuration information of an I Frame. As an example, the display-configuration information-acquisition module 810 implements the process S810.

In another embodiment, the display-configuration information device 800 includes: a seventh determination module 820 configured to determine whether the I Frame is the first I Frame in the video coding stream or the designated I Frame according to the display configuration information. As an example, the seventh determination module 820 implements the process S820.

In yet another embodiment, the display-configuration information device 800 includes: a seventh control module 830 configured to, if the I Frame is the first I Frame in the video coding stream or if the I Frame is designated according to the display configuration information, not display the I Frame; and if the I Frame is not the first I Frame in the video coding stream or if the I Frame is not designated according to the display configuration information, display the I Frame. As an example, the seventh control module 830 implements the process S830 and the process S840.

Figure 21:
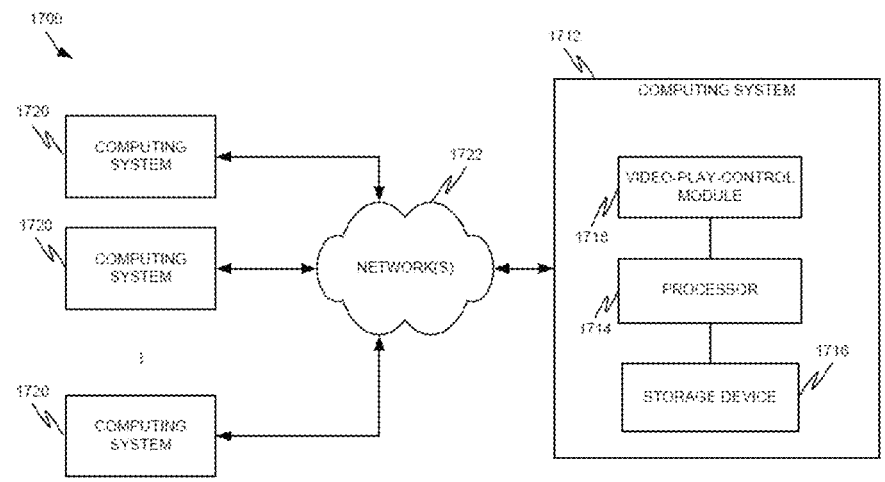
FIG. 21 is an example diagram for a system for video display control according to one embodiment of the present disclosure.

FIG. 21 is an example diagram for a system for video display control according to one embodiment of the present disclosure. As shown in FIG. 21, the system 1700 includes a computing system 1712 which contains a processor 1714, a storage device 1716 and a video-display-control module 1718. The computing system 1712 includes any suitable type of computing device (e.g., a server, a desktop, a laptop, a tablet, a mobile phone, etc.) that includes the processor 1714 or provide access to a processor via a network or as part of a cloud based application. The video-display-control module 1718 includes tasks and is implemented as part of a user interface module (The video-display-control module 1718 is not shown in FIG. 21).

Figure 22:
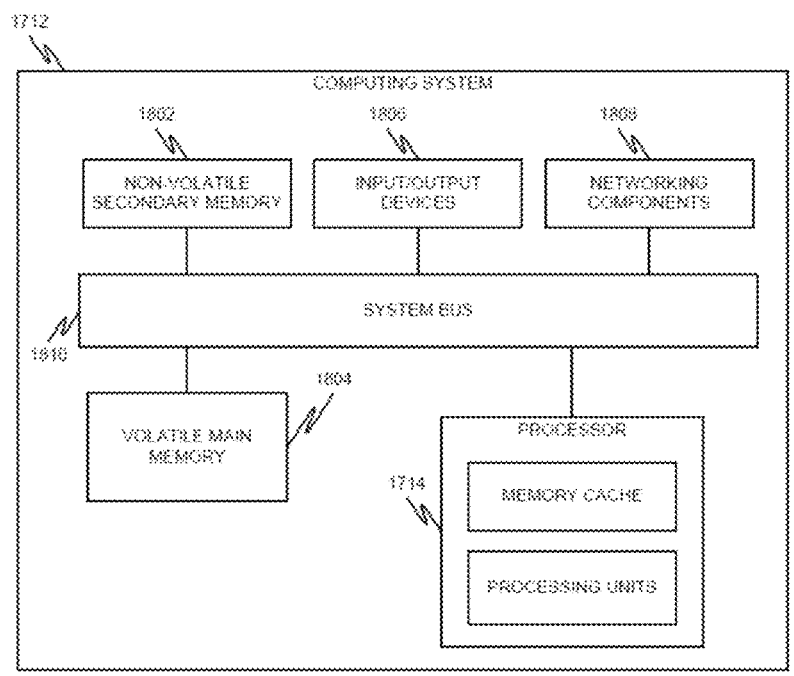
FIG. 22 is an example diagram showing a computing system for video display control.

FIG. 22 is an example diagram showing a computing system for video display control. As shown in FIG. 22, the computing system 1712 includes a processor 1714, memory devices 1802 and 1804, one or more input/output devices 1806, one or more networking components 1808, and a system bus 1810. In some embodiments, the computing system 1712 includes the video-display-control module 1718, and provides access to the video-display-control module 1718 to a user as a stand-alone computer (The video-display-control module 1718 is not shown in FIG. 22).

According to one embodiment, provided herein is a method for video display control. An example method includes: determining whether a coding frame extracted from a video coding stream is an I Frame; and if the coding frame extracted from the video coding stream is determined as an I Frame, performing display control on the I Frame based at least in part on frame information of the extracted I Frame and one or more adjacent coding frames after the I Frame.

According to another embodiment, a system for video display control includes: an extraction device configured to extract a coding frame in a video coding stream; a determination device configured to determine whether the extracted coding frame is an I Frame; and a display control device configured to, if the coding frame extracted from the video coding stream is determined as an I Frame, perform display control on the I Frame based at least in part on frame information of the extracted I Frame and one or more adjacent coding frames after the I Frame.

According to yet another embodiment, a system for video display control includes: one or more data processors; and one or more non-transitory computer-readable storage media encoded with instructions for commanding the data processors to execute certain operations. The operations include: determining whether a coding frame extracted from a video coding stream is an I Frame; and if the coding frame extracted from the video coding stream is determined as an I Frame, performing display control on the I Frame based at least in part on frame information of the extracted I Frame and one or more adjacent coding frames after the I Frame.

According to yet another embodiment, a non-transitory computer-readable storage medium is encoded with instructions for commanding one or more processors to execute a method for video display control. The method includes: determining whether a coding frame extracted from a video coding stream is an I Frame; and if the coding frame extracted from the video coding stream is determined as an I Frame, performing display control on the I Frame based at least in part on frame information of the extracted I Frame and one or more adjacent coding frames after the I Frame.

Figure 23:
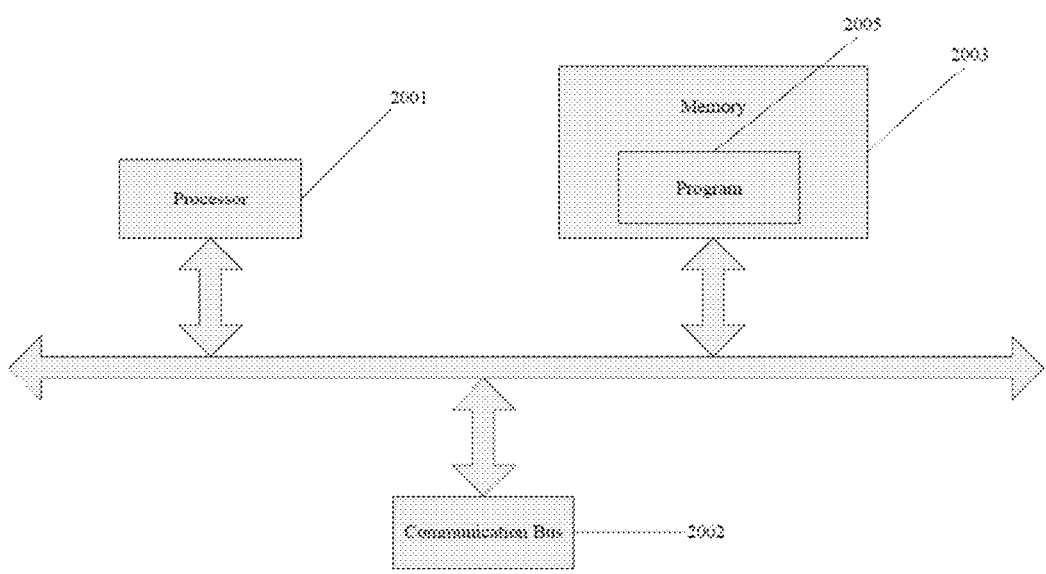
FIG. 23 is an example diagram showing a computing system for video display control.

According to yet another embodiment, provided herein is a system for video display control, which includes: processor 2001, Communication Interface 2002, memory 2003 and Communication Bus 2004. In one embodiment, provided here is a system for video display control substantially as depicted in FIG. 23. In one embodiment, processor 2001, Communication Interface 2001, and memory 2003 communicate with each other through Communication Bus 2004. In one embodiment, processor 2001 is configured to execute program 2005. In one embodiment, program 2005 includes program codes, wherein the program codes include program instructions.

According to yet another embodiment, processor 2001 is a Central Processing Unit (CPU), or Application Specific Integrated Circuit (ASIC), or configured to one or more integrated circuits implementing the embodiments of the present disclosure.

According to yet another embodiment, memory 2003 is configured to store program 2005. In one embodiment, memory 2003 includes high-speed RAM. In one embodiment, memory 2003 further includes non-volatile memory. In one embodiment, memory 2003 includes at least one magnetic disk memory.

According to yet another embodiment, program 2005 is configured to execute the procedures including: determining whether a coding frame extracted from the video coding stream is an I Frame; if the coding frame extracted from the video coding stream is an I Frame, acquiring a timestamp of the I Frame and a timestamp of an adjacent coding frame after the I Frame; and controlling display of the I Frame based on the timestamp of the I Frame and the timestamp of the adjacent coding frame after the I Frame. In another embodiment, procedures of program 2005 may be implemented as described in one or more embodiments above.

For example, the processor may be configured to execute the program to implement:

calculating a difference between the timestamp of the I Frame and the timestamp of the adjacent coding frame after the I Frame; and controlling the display of the I Frame based on the difference.

Alternatively, the processor may be configured to execute the program to implement:

acquiring frame rate information of the video coding stream, and calculating an acceptable difference value between timestamps based on the frame rate information, before controlling the display of the I Frame based on the difference;

controlling the display of the I Frame based on the difference further includes:

determining whether the difference is within the range of the acceptable difference value;

if the difference is within the range of the acceptable difference value, displaying the I Frame; and if the difference is outside of the acceptable difference value, not displaying the I Frame.

Alternatively, the processor may be configured to execute the program to implement:

determining whether the difference exceeds a preset threshold;

if the difference exceeds the preset threshold, not displaying the I Frame; and if the difference does not exceed the preset threshold, displaying the I Frame.

Alternatively, the processor may be configured to execute the program to implement:

determining whether the timestamp of the I Frame is later than the timestamp of the adjacent coding frame after the I Frame;

if the timestamp of the I Frame is later than the timestamp of the adjacent coding frame after the I Frame, not displaying the I Frame; and if the timestamp of the I Frame is earlier than the timestamp of the adjacent coding frame after the I Frame, displaying the I Frame.

Alternatively, the processor may be configured to execute the program to implement:

before the timestamp of the I Frame and the timestamp of the adjacent coding frame after the I Frame is acquired, acquiring a relevant tag in an encapsulation layer or an encoding layer of the I Frame; and if the relevant tag indicating that the I Frame is required to be displayed, performing the step of acquiring the timestamp of the I Frame and the timestamp of the coding frame after the I Frame, wherein the relevant tag is a mark indicating types of code stream or frames in the encapsulation layer or the encoding layer.

Alternatively, the processor may be configured to execute the program to implement:

if the coding frame extracted from a video coding stream is not an I Frame, displaying the coding frame.

Alternatively, the video code stream may include one or more picture groups; and each picture group may include one I Frame, Refreshment P Frames and common P Frames;

wherein the Refreshment P Frames and the common P Frames are after the I Frame and directly or indirectly refer to the I Frame; and wherein the adjacent coding frame after the I Frame within a same picture group is stored as a Refreshment P Frame when the video code stream is stored.

Alternatively, the processor may be configured to execute the program to implement:

before the timestamp of the I Frame and the timestamp of the adjacent coding frame after the I Frame is acquired, acquiring display-configuration information of the I Frame;

determining whether the I Frame is a first I Frame in the video coding stream or a designated I Frame based on the display-configuration information; and if the I Frame is not the first I Frame in the video coding stream or the designated I Frame defined by the display-configuration information, performing the step of acquiring the timestamp of the I Frame and the timestamp of an adjacent coding frame after the I Frame.

According to embodiments of the present disclosure, the data (such as a video figure) corresponding to the I frame is detected before it is displayed, to obtain the information of the I frame and the coding frame(s) after the I frame, and then determine quickly whether to display the data corresponding to the I frame or not based on the obtained information, so as to avoid the abnormal long time stay during the display of the decoded data of the I frame. The embodiments of the present disclosure may be applied to the display of both the modified coding streams (such as the coding streams in the embodiments of FIGS. 2-23) and the display of the traditional coding streams (such as the coding streams in the embodiment of FIG. 1).

The above only describes several scenarios presented by this disclosure, and the description is relatively specific and detailed, yet it may not therefore be understood as limiting the scope of this disclosure. It should be noted that ordinary technicians in the field may also, without deviating from the disclosure's conceptual premises, make a number of variations and modifications, which are all within the scope of this disclosure. As a result, in terms of protection, the patent claims may prevail. Also, the diagrams in the present disclosure are merely examples, which should not unduly limit the scope of the claims. One of ordinary skill in the art would recognize many variations, alternatives, and modifications.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, various embodiments and/or examples of the present disclosure can be combined.

Additionally, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations/processes are depicted in the drawings in a particular order, this should not be understood as requiring that such operations/processes be performed in the particular order shown or in sequential order, or that all illustrated operations/processes be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it is understood by those of skill in the art that there are other embodiments that are equivalent to the described embodiments. Accordingly, it is to be understood that the disclosure is not to be limited by the specific illustrated embodiments, but only by the scope of the appended claims.

What is claimed is:

1. A method for controlling video display, comprising:
determining, by one or more processors, whether a coding frame extracted from a video coding stream is an I Frame;
if the coding frame extracted from the video coding stream is an I Frame, acquiring, by the one or more processors, a timestamp of the I Frame and a timestamp of a next frame to be decoded in the video coding stream after the I Frame;
calculating a difference between the timestamp of the I Frame and the timestamp of the next frame to be decoded after the I Frame;
determining whether the difference exceeds a preset threshold;
if the difference exceeds the preset threshold, then not displaying the I Frame; and
if the difference does not exceed the preset threshold, then displaying the I Frame.

2. The method of claim 1, further comprising:
acquiring frame rate information of the video coding stream; and
calculating an acceptable difference value between timestamps based on the frame rate information;
wherein the preset threshold is based on the acceptable difference value.

3. The method in claim 1, further comprising:
if the coding frame extracted from a video coding stream is not an I Frame, then displaying the coding frame.

4. A system for controlling video display, comprising:
a processor, a communication interface, a memory and a communication bus,
wherein the processor, the communication interface and the memory communicate with each other through the communicate bus;
the memory is configured to store a program, and the processor is configured to execute the program to implement:
determining whether a coding frame extracted from a video coding stream is an I Frame;
if the coding frame extracted from the video coding stream is an I Frame, acquiring a timestamp of the I Frame and a timestamp of a next frame to be decoded in the video coding stream after the I Frame;
calculating a difference between the timestamp of the I Frame and the timestamp of the next frame to be decoded after the I Frame;
determining whether the difference exceeds a preset threshold;
if the difference exceeds the preset threshold, then not displaying the I Frame; and
if the difference does not exceed the preset threshold, then displaying the I Frame.

5. The system of claim 4, wherein the processor is configured to execute the program to implement:
acquiring frame rate information of the video coding stream, and calculating an acceptable difference value between timestamps based on the frame rate information,
wherein the preset threshold is based on the acceptable difference value.

6. The system of claim 4, wherein the processor is configured to execute the program to implement:
if the coding frame extracted from a video coding stream is not an I Frame, displaying the coding frame.

* * * * *

EX PARTE REEXAMINATION CERTIFICATE (170th)
Ex Parte Reexamination Ordered under 35 U.S.C. 257

United States Patent
Chen et al.

(10) Number: US 10,182,238 C1
(45) Certificate Issued: May 18, 2020

(54) SYSTEMS AND METHODS FOR CONTROLLING VIDEO DISPLAY

(71) Applicant: Hangzhou Hikvision Digital Technology Co., Ltd., Hangzhou (CN)

(72) Inventors: Jie Chen, Hangzhou (CN); Shiliang Pu, Hangzhou (CN); Hai Yu, Hangzhou (CN)

(73) Assignee: HANGZHOU HIKVISION DIGITAL TECHNOLOGY CO., LTD.

Supplemental Examination Request:
No. 96/000,301, Nov. 21, 2019

Reexamination Certificate for:
Patent No.: 10,182,238
Issued: Jan. 15, 2019
Appl. No.: 15/079,449
Filed: Mar. 24, 2016

(30) Foreign Application Priority Data

Mar. 25, 2015 (CN) .......................... 2015 1 0131031

(51) Int. Cl.
*H04N 19/52* (2014.01)
*H04N 19/112* (2014.01)
*H04N 19/139* (2014.01)
*H04N 19/42* (2014.01)
*H04N 19/50* (2014.01)
*H04N 19/70* (2014.01)
*H04N 21/8547* (2011.01)

(52) U.S. Cl.
CPC ........... *H04N 19/52* (2014.11); *H04N 19/112* (2014.11); *H04N 19/139* (2014.11); *H04N 19/42* (2014.11); *H04N 19/50* (2014.11); *H04N 19/70* (2014.11); *H04N 21/8547* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,301, please refer to the USPTO's public Patent Application Information Retrieval (PAIR) system under the Display References tab.

*Primary Examiner* — Christina Y. Leung

(57) ABSTRACT

Systems and methods are provided for video display control. An example method includes: determining, by one or more processors, whether a coding frame extracted from a video coding stream is an I Frame; if the coding frame extracted from the video coding stream is an I Frame, acquiring, by the one or more processors, a timestamp of the I Frame and a timestamp of an adjacent coding frame after the I Frame; and controlling, by the one or more processors, display of the I Frame based on the timestamp of the I Frame and the timestamp of the adjacent coding frame after the I Frame.

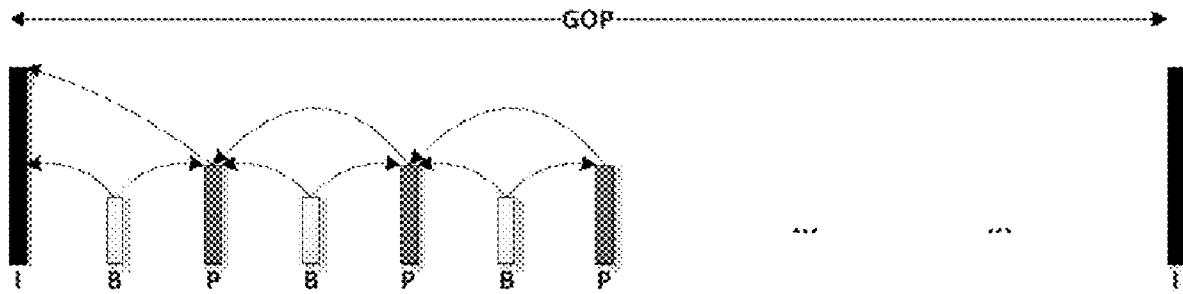

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 and 6 is confirmed.

Claims 1 and 4 are cancelled.

Claims 2 and 5 are determined to be patentable as amended.

2. [The method of claim 1, further comprising:] *A method for controlling video display, comprising:*
   determining, *by one or more processors,* whether a coding frame extracted from a video coding stream is an I Frame;
   if the coding frame extracted from the video coding stream is an I Frame, acquiring, *by the one or more processors,* a timestamp of the I Frame and a timestamp of a next frame to be decoded in the video coding stream after the I Frame;
   calculating a difference between the timestamp of the I Frame and the timestamp of the next frame to be decoded after the I Frame;
   determining whether the difference exceeds a preset threshold;
   if the difference exceeds the preset threshold, then not displaying the I Frame;
   *if the difference does not exceed the preset threshold, then displaying the I Frame;*
   acquiring frame rate information of the video coding stream; and
   calculating an acceptable difference value between timestamps based on the frame rate information;
   wherein the preset threshold is based on the acceptable difference value.

5. [The system of claim 4.] *A system for controlling video display, comprising:*
   *a processor, a communication interface, a memory and a communication bus,*
   *wherein the processor, the communication interface and the memory communicate with each other through the communication bus;*
   *the memory is configured to store a program, and the processor is configured to execute the program to implement:*
   *determining whether a coding frame extracted from a video coding stream is an I Frame;*
   *if the coding frame extracted from the video coding stream is an I Frame, acquiring a timestamp of the I Frame and a timestamp of a next frame to be decoded in the video coding stream after the I Frame;*
   *calculating a difference between the timestamp of the I Frame and the timestamp of the next frame to be decoded after the I Frame;*
   *determining whether the difference exceeds a preset threshold;*
   *if the difference exceeds the preset threshold, then not displaying the I Frame; and if the difference does not exceed the preset threshold, then displaying the I Frame;*
   wherein the processor is configured to execute the program to implement:
   acquiring frame rate information of the video coding stream, and calculating an acceptable difference value between timestamps based on the frame rate information,
   wherein the preset threshold is based on the acceptable difference value.

* * * * *